(12) United States Patent
Szarski et al.

(10) Patent No.: US 10,788,813 B2
(45) Date of Patent: Sep. 29, 2020

(54) SYSTEMS AND METHODS FOR MACHINING TO NOMINAL GEOMETRY USING LOCAL FEATURES

(71) Applicant: The Boeing Company, Chicago, IL (US)

(72) Inventors: Martin A. Szarski, Canterbury (AU); David M. Bain, Ashburton (AU); Phillip J. Crothers, Hampton East (AU)

(73) Assignee: The Boeing Company, Chicago, IL (US)

( * ) Notice: Subject to any disclaimer, the term of this patent is extended or adjusted under 35 U.S.C. 154(b) by 495 days.

(21) Appl. No.: 14/525,533

(22) Filed: Oct. 28, 2014

(65) Prior Publication Data

US 2016/0116905 A1 Apr. 28, 2016

(51) Int. Cl.
*G05B 19/4099* (2006.01)
*B25J 9/16* (2006.01)

(52) U.S. Cl.
CPC ........ *G05B 19/4099* (2013.01); *B25J 9/1669* (2013.01); *G05B 2219/31068* (2013.01); *G05B 2219/45064* (2013.01); *G05B 2219/50336* (2013.01); *Y02P 90/04* (2015.11)

(58) Field of Classification Search
None
See application file for complete search history.

(56) References Cited

U.S. PATENT DOCUMENTS

| 5,077,941 A | * | 1/1992 | Whitney | ................ B24B 19/26 451/11 |
| 6,064,759 A | * | 5/2000 | Buckley | ............... G01B 11/024 348/125 |
| 8,010,226 B2 | | 8/2011 | Crothers | |

* cited by examiner

*Primary Examiner* — Mohammad Ali
*Assistant Examiner* — Saad M Kabir
(74) *Attorney, Agent, or Firm* — Miller, Matthias & Hull LLP

(57) ABSTRACT

Systems and methods for retuning a surface to a nominal geometry using local reference points are disclosed. The system can include an imaging device for detecting the location of local features on an object. The system can use the location of local features, as opposed to an absolute reference frame, to determine one or more reference areas and one or more surface defects on an object. The system can then determine a nominal geometry for the surface (i.e., a surface that is substantially free of surface defects) and calculate the tool path necessary to create a nominal geometry. The system can machine the surface and, in some cases, rescan the surface to ensure the operation has machined the part to the nominal geometry.

20 Claims, 17 Drawing Sheets

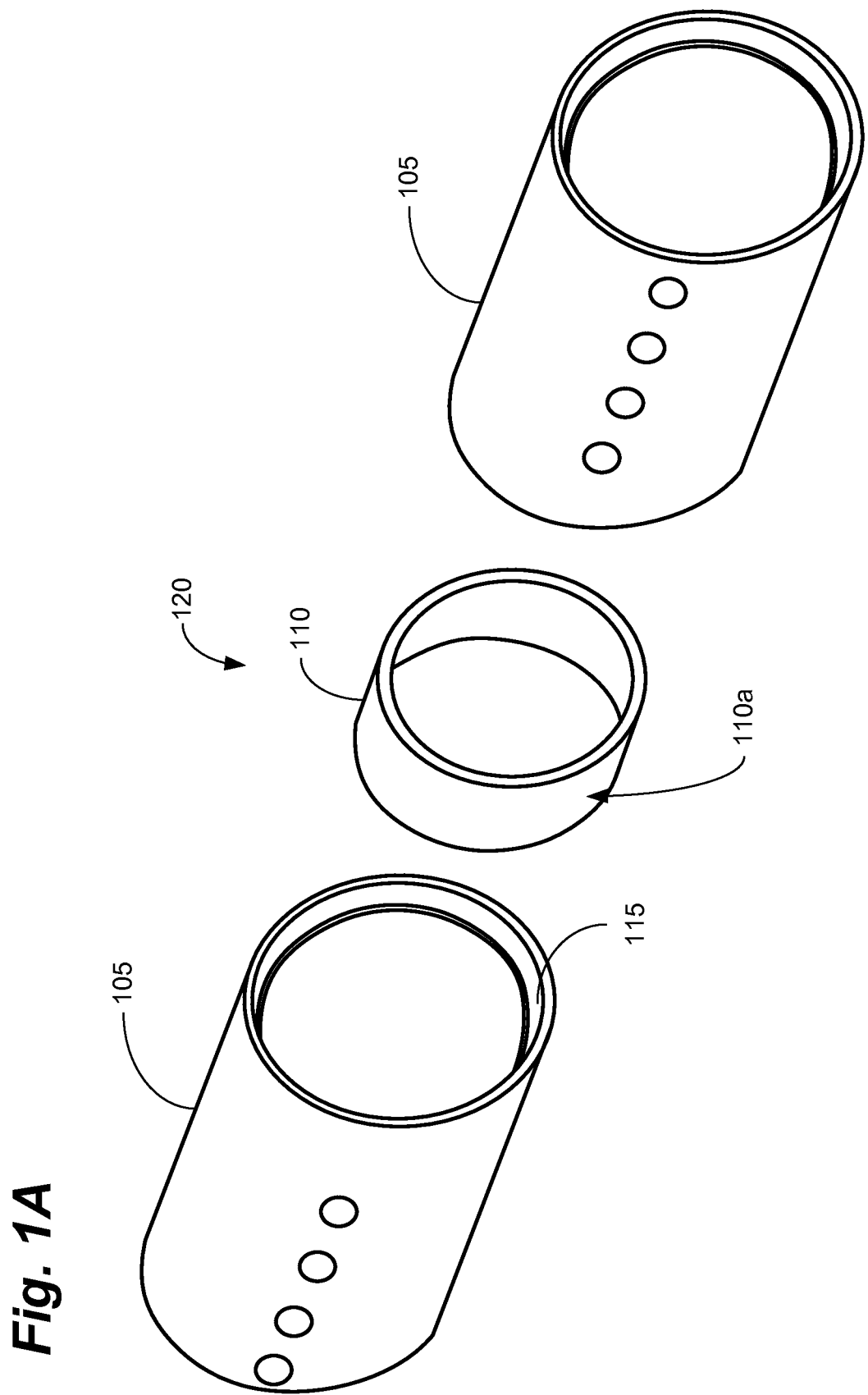

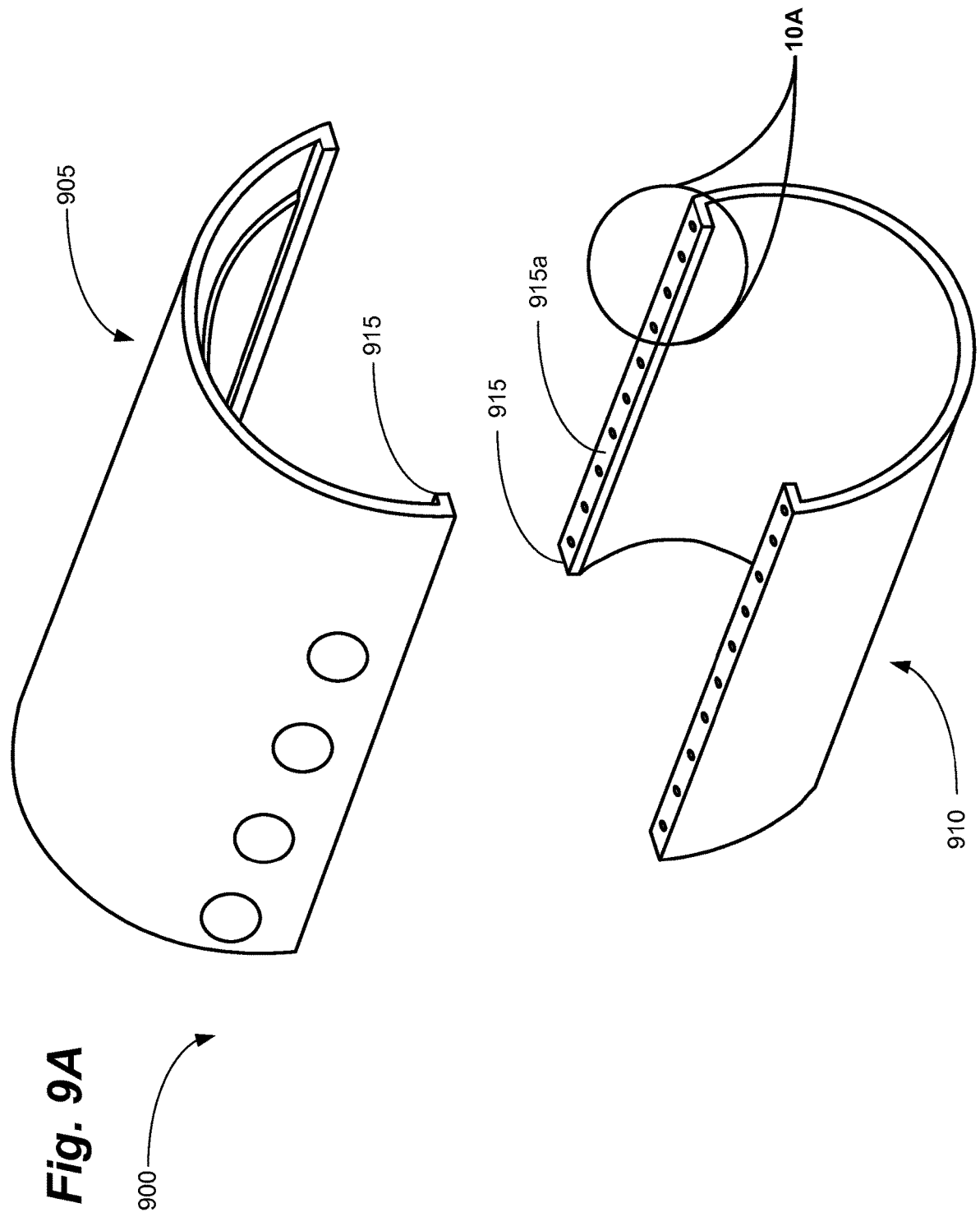

SYSTEMS AND METHODS FOR MACHINING TO NOMINAL GEOMETRY USING LOCAL FEATURES

FIELD

Embodiments of the present disclosure relate generally to robotic machining and specifically to guiding robotic machining using local surface features.

BACKGROUND

Robots and other computer controller machines are used widely in manufacturing. Robots are often used, for example, to perform repetitive tasks that require a high level of precision. Robots are used on vehicle assembly lines to perform welding operations, install glass, and even install valve seats in high performance engines.

Robots are useful in many of these roles because the part involved can be precisely positioned in a repeatable manner. In other words, the robot works on the same part in the same position and thus, has a useful coordinate system to direct its movements. For a frame welding robot, for example, the frame to be welded is placed into a jig that precisely locates the frame. Thus, while the robot may have programs to weld multiple frames, the frame is nonetheless located in a jig providing a fixed coordinate system.

A problem arises, however, when the part is so large, flexible, or otherwise variable that a fixed coordinate system is not particularly useful. If a robot were to use a fixed coordinate system on a composite aircraft fuselage barrel, for example, which is very large and fairly flexible in its unassembled form, inaccuracies would quickly compound as the robot moved farther from the origin of the fixed coordinate system. This could be due to small manufacturing tolerances being magnified over large distances, minor composite "sag" due to the flexibility of composite components, or issues with accurately locating the part itself in space.

What is needed therefore are systems and methods for accurately locating a robot in space to perform various functions. The system should use a combination of technologies to enable a robot, or other machine, to accurately locate itself on a part without the use of an absolute reference frame. It is to such systems and methods that embodiments of the present disclosure are primarily directed.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present disclosure are related to systems and methods for machining parts to a nominal geometry. The system can utilize an imaging device to locate one or more local features. The system can then use the local features to determine the location of various reference areas and surface defects for machining.

Embodiments of the present disclosure can include a method for machining an object to a nominal geometry. In some embodiments, the method can include scanning a surface of the object with a first imaging device and comparing data from the first imaging device to a predetermined dataset. The method can also include locating one or more local features on the surface based on the predetermined dataset, determining a location of one or more reference areas on the surface based on the location of the one or more local features, and determining a location of one or more surface defects on the surface to be machined based on the location of the one or more reference areas.

Embodiments of the present disclosure can also include a method for returning an object to a nominal geometry including scanning a surface of the object with a first imaging device and comparing data from the first imaging device to a predetermined dataset. The method can also include determining a location of one or more local features on the surface, determining a location of one or more reference areas on the surface based on the location of the one or more local features, and determining a location of one or more surface defects on the surface based on the location of the one or more reference areas. Using this information, the method can also determine a nominal geometry for the surface based on the one or more reference areas and calculate a tool path to machine the surface to the nominal geometry. This can enable the system to machine the surface to the nominal geometry. To verify results, the method can also include rescanning the surface with the first imaging device and determining if the surface conforms to the nominal geometry.

Embodiments of the present disclosure can also include a system for machining a surface of an object to a nominal geometry. In some embodiments, the system can include a robotic arm. The robotic arm can include one or more arm motors for positioning the robotic arm, one or more tool motors for positioning a tool holder on the robotic arm, one or more machining devices for machining the surface of the object to the nominal geometry, and a first imaging device to identify one or more local features, one or more reference areas, and one or more surface defects on the surface.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 1A depicts two composite aircraft fuselage barrel sections prior to joining, in accordance with some embodiments of the present disclosure.

FIG. 9A depicts two fuselage halves for a clamshell-type fuselage, in accordance with some embodiments of the present disclosure.

Each figure shown in this disclosure shows a variation of an aspect of the embodiment presented, and only differences will be discussed in detail.

DETAILED DESCRIPTION

Embodiments of the present disclosure relate generally to robotic machining and specifically to guiding robotic machining using local surface features. In some embodiments, the system can comprise a robotic machine (e.g., a robotic arm or mobile robot) including an imaging device. Rather than relying solely on an absolute coordinate system, the robot can utilize local references to accurately locate and machine one or more areas of a part or assembly.

To simplify and clarify explanation, the disclosure is described herein as a robot for machining composite barrel edges to a nominal geometry. One skilled in the art will recognize, however, that the disclosure is not so limited. The system can be used, for example and not limitation, with other types of robotics, computer numerically controlled (CNC) milling and cutting machines, and other systems where high accuracy is required when machining large and/or uncertain work pieces. The system can also be used for machining the surfaces of clamshell style fuselages, or other construction methods that require precise machining for proper joining of components. The disclosure could also be used in conjunction with a fixed coordinate system to supplement machine accuracy.

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure.

Figure 1B:
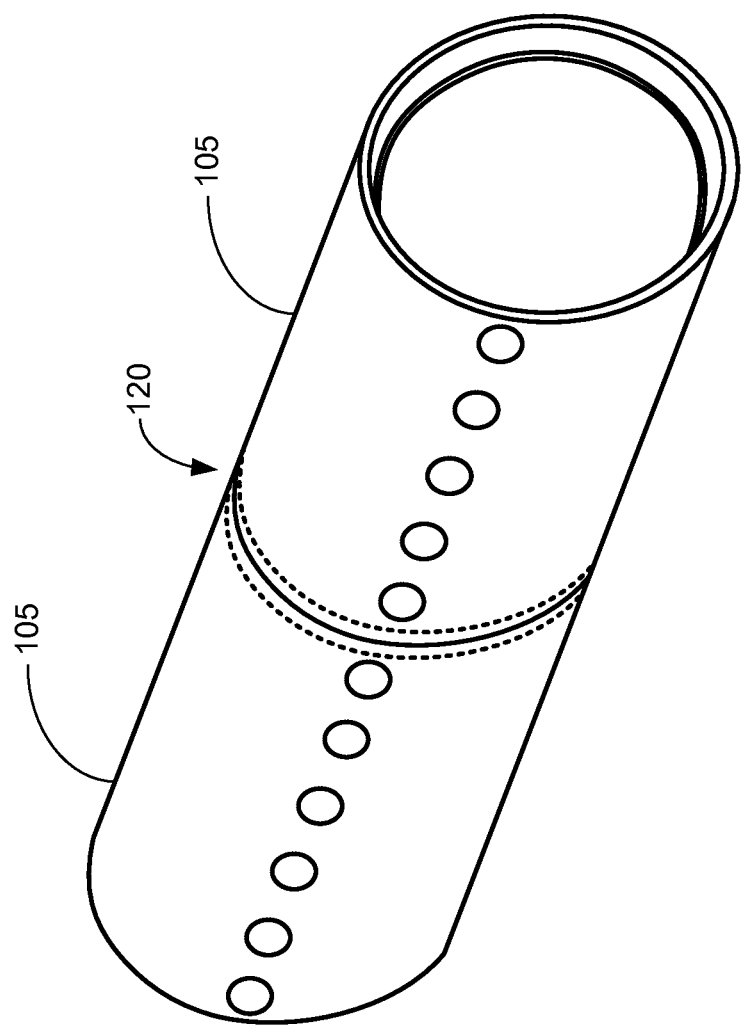
FIG. 1B depicts the two composite fuselage barrels of FIG. 1A assembled, in accordance with some embodiments of the present disclosure.

As shown in FIGS. 1A and 1B, the fuselage of a modern aircraft comprise multiple composite barrels 105 joined together with a lap joint 120. In some embodiments, the lap joint 120 can comprise a lip 115 inside the barrel 105 and an adapter ring 110. As shown, in some embodiments, each composite barrel 105 can comprise an area, or lip 115, proximate the end of the barrel 105. In some embodiments, the lip 115 can be at the same level as the remainder of the barrel 105 (i.e., the lip 115 has the same inner diameter as the barrel 105) into which the adapter ring 110 is seated. In other embodiments, the lip 115 may be recessed or raised with respect to the inner diameter of the barrel 105. In still other embodiments, the composite barrels 105 can have a consistent inner diameter (i.e., with no lip), with the adapter ring 110 sized and shaped to fit inside the barrel sections 105.

Regardless, to join the barrels 105, an adhesive can be applied to the outer surface 110A of the adapter 110 and the inner surface of the barrel 105 (i.e., the lip 115) to bond the parts together. In some embodiments, fasteners may be used instead of, or in addition to, adhesive. In order to provide a good fit and maximize surface contact to improve bonding and provide a strong joint, however, the outside diameter of the adapter ring 110 and the inside diameter of the lip 115 must have substantially the same shape or curvature (e.g., within approximately 0.005").

Figure 2:
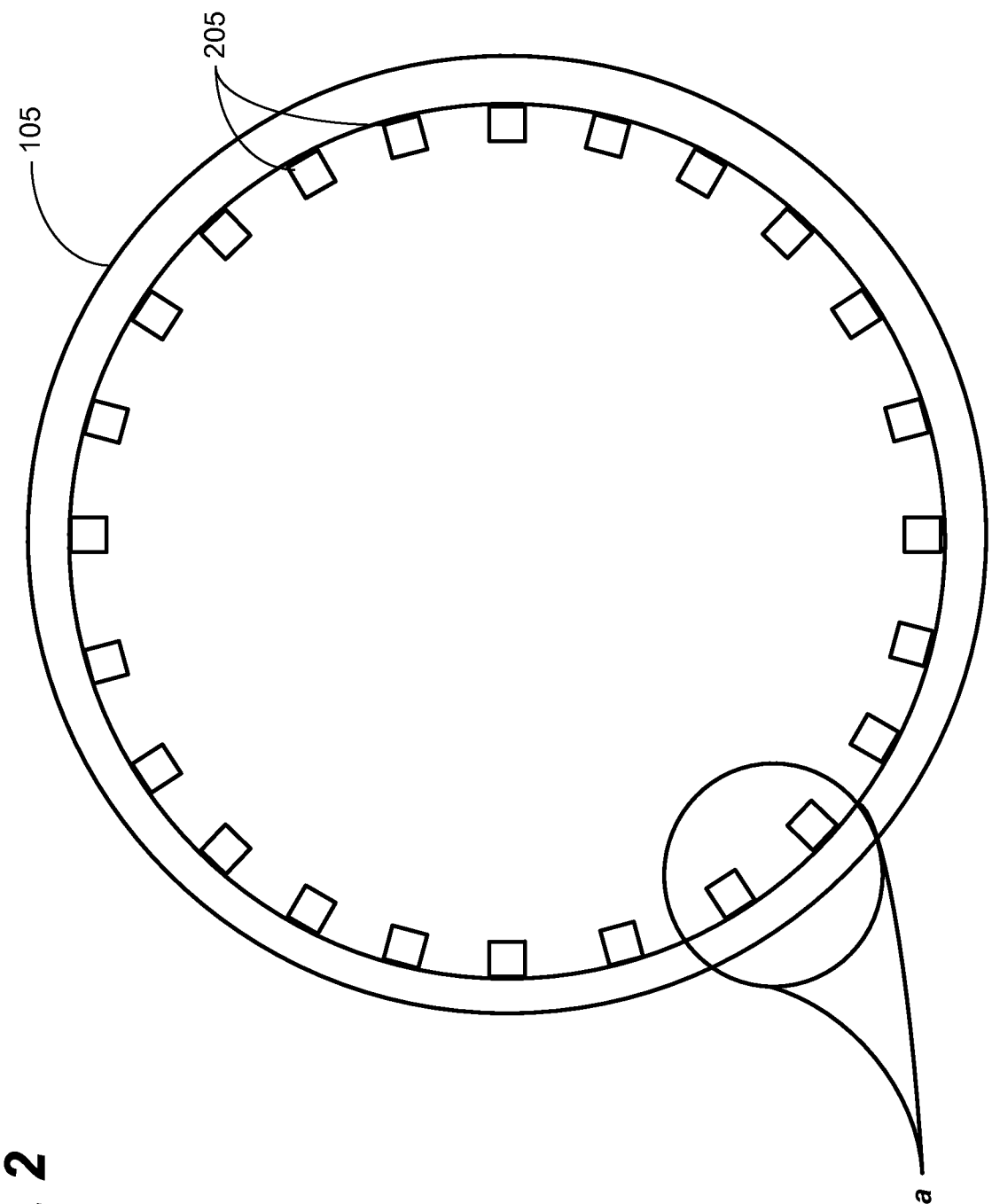
FIG. 2 is an end view of a composite barrel section, in accordance with some embodiments of the present disclosure.

As shown in FIG. 2, however, each barrel section generally comprises a plurality of stiffeners 205 (or "stringers") to increase the longitudinal stiffness of the barrel 105. In some embodiments, the stiffeners 205 can be hollow structures and can comprise, for example and not limitation, carbon fiber, Kevlar, aluminum, steel, or composites thereof. The stiffeners 205 can extend the length of the barrel section 105, but stop at, or before, the lip 115. In this manner, the lip 115 can be a substantially smooth, rounded surface.

Figure 3A:
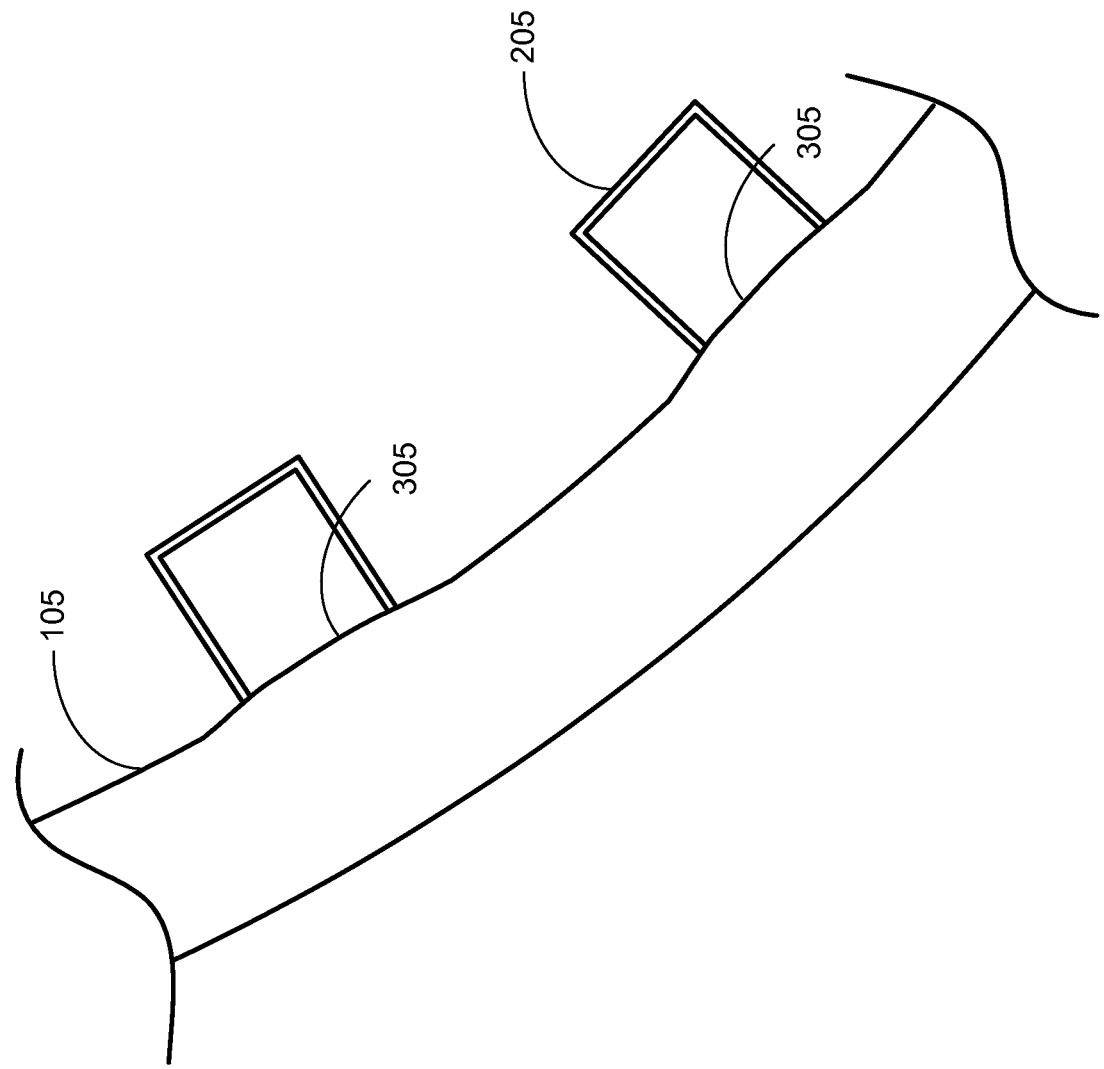
FIG. 3A is a detailed, end view of a composite barrel section, in accordance with some embodiments of the present disclosure.
Figure 3B:
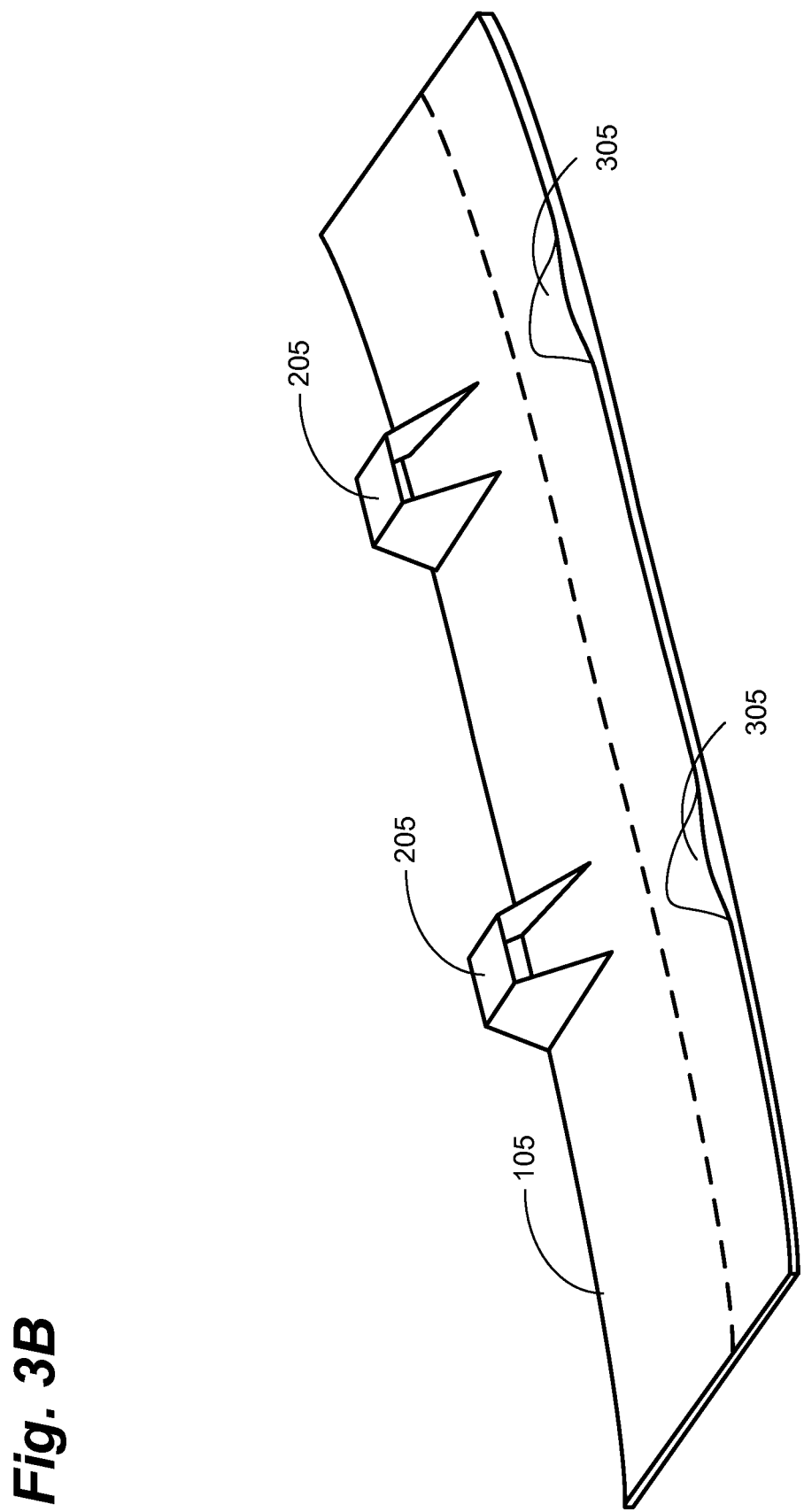
FIG. 3B is a detailed, perspective view of a composite barrel section, in accordance with some embodiments of the present disclosure.
Figure 4:
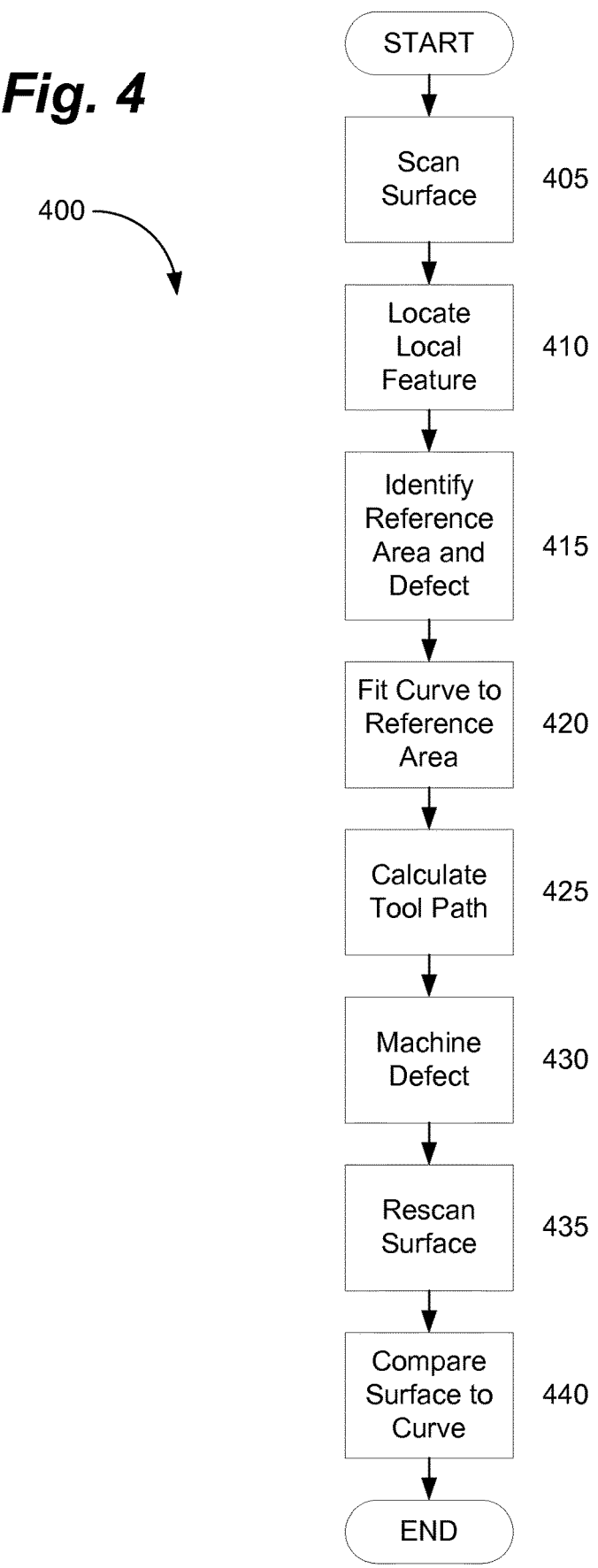
FIG. 4 depicts a method for machining a composite barrel section to the nominal curvature, in accordance with some embodiments of the present disclosure.

Composite barrels 105 are fairly difficult to manufacture. The process generally comprises laying up composite fabric (e.g., carbon fiber, Kevlar, etc.) in a mold or over a mandrel and then inflating a bladder inside the barrel 105 to forcefully conform the outside of the barrel 105 to the inside of the mold. As shown in FIGS. 3A and 3B, however, due to the location of the stringers 205, slight deviations, or humps 305, can occur in the curvature of the lip 115. These humps 305 occur because the ends of the stringers 205 slightly deform the ends of the bladder, preventing the bladder from fully assuming the profile of the mold.

Conventionally, to correct these humps 305, a worker using a template and feeler gauges has manually ground, sanded, and shaped the humps 305 out of the barrel 105 to the nominal curvature (i.e., such that the curvature is substantially consistent around the inside diameter of the barrel 105 proximate the lip 115). This process is tedious and time consuming however, as each lip requires between approximately 35-50 hours of hand reshaping.

To this end, embodiments of the present disclosure relate to systems and methods for establishing a coordinate system suitable to machine the lips 115 using robots or other automated tools. Embodiments of the present disclosure can comprise a method 400 for machining a part to a nominal geometry. In some embodiments, the method 400 can comprise scanning 405 the surface of the structure with a suitable imaging device. The method 400 can then locate 410 one or more "local" features. Local features can comprise, for example, stringers, fasteners, holes, or other references that serve to locate the robot locally. The method can continue with identifying 415 reference areas and defects based on the localization. The reference areas, for example, can be areas that are known to be substantially free from defects during the manufacturing process (e.g., the area in between stringers on barrel sections 105, as discussed above). In some cases, the defects can be identified 415 based on their proximity to the reference areas or to the local features (e.g., defects are known to occur at the ends of the stringers). In other embodiments, the defects can be identified 415 using the imaging device based on, for example and not limitation, curvature above or below a predetermined curvature, discontinuities, or deviation from known geometries. In some embodiments, the data from the imaging device can be compared to a predetermined dataset—e.g., CAD data, technical drawings, or other data related to the parts—to identify surface deviations.

In some embodiments, the method 400 can continue by fitting 420 a curve to the reference area and the defect. As then name implies, the reference area, or known good areas, can be used to establish the curve (or other geometry) fitting the nominal geometry of the structure. As a result, fitting 420 a curve across two or more reference areas can establish a nominal curvature for machining a surface defect. In some embodiments, curve fitting 420 can also comprise the comparison of the surface to known geometries (e.g., from manufacturing CAD files), standard algebraic curve fitting, or other suitable methods. Based on this calculation, the method 400 can calculate 425 the necessary tool path for the robot to bring the surface into nominal geometry. This can be done using CAD-CAM software, for example, combined with data from the imaging device. In some embodiments, based on the thickness of the defect, for example, the system can create multiple tool paths to remove material at the desired rate. In a preferred embodiment, the data from the imaging device can be provided to a custom point cloud processor and tool path generator.

Once the tool path(s) is calculated, the robot can machine 430 the surface to remove the defect and provide the nominal curvature/contour. As mentioned above, this may take one or more tool paths and passes with one or more tools to achieve the desired shape, curvature, contour, and/or surface roughness. To ensure the surface has been corrected, the system can then rescan 435 the surface. The scanned surface can be compared 440 to, for example and not limitation, the calculated tool path, the curve fit, or known good CAD/CAM data. After correcting a first area, the robot can move a predetermined amount (e.g., by locating the next stringer) and the process 400 can be restarted on a second area until all surface defects have been corrected (e.g., on a particular barrel end).

Figure 5A:
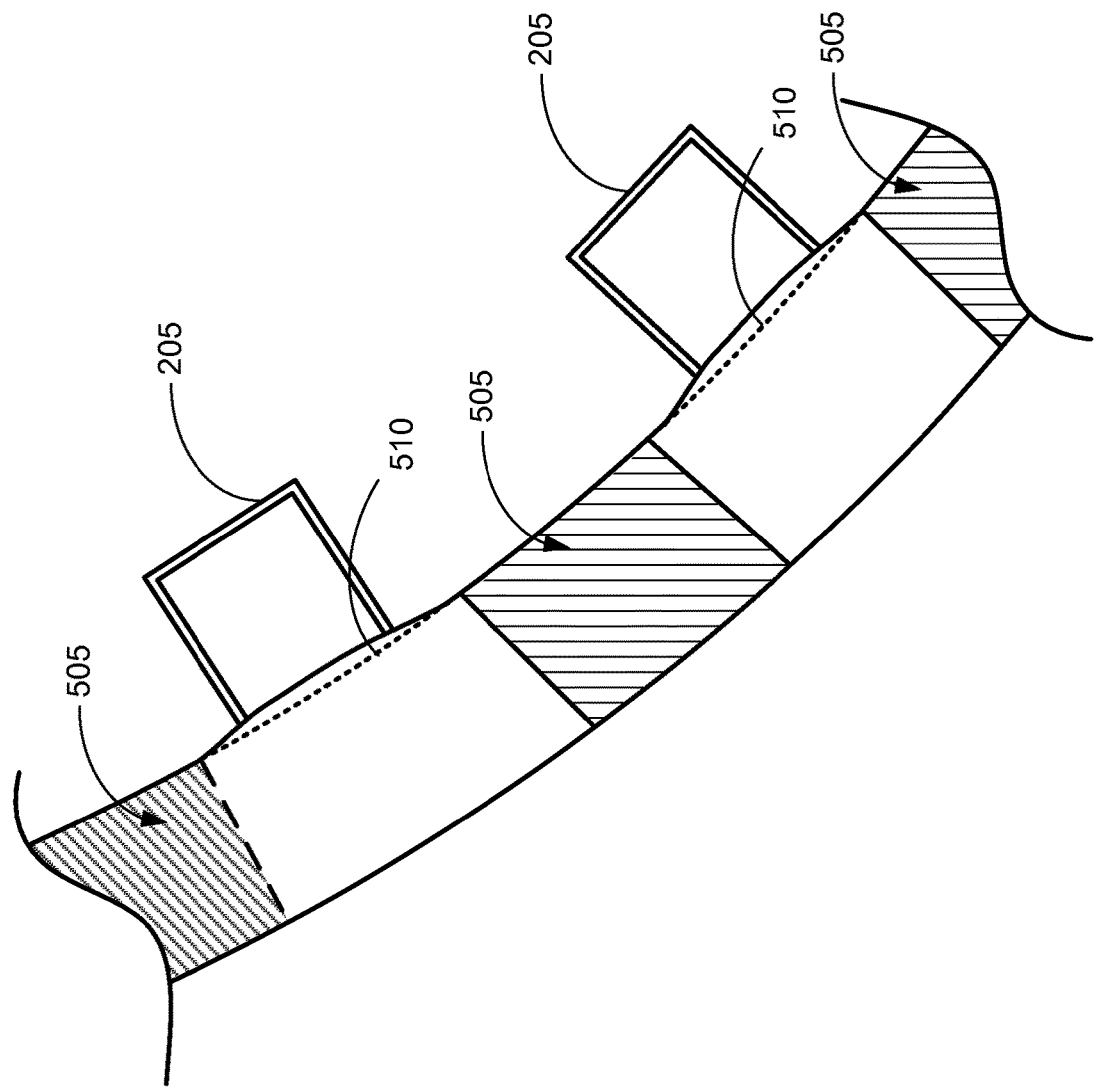
FIG. 5A is a detailed, end view of a composite barrel section including reference areas, in accordance with some embodiments of the present disclosure.
Figure 5B:
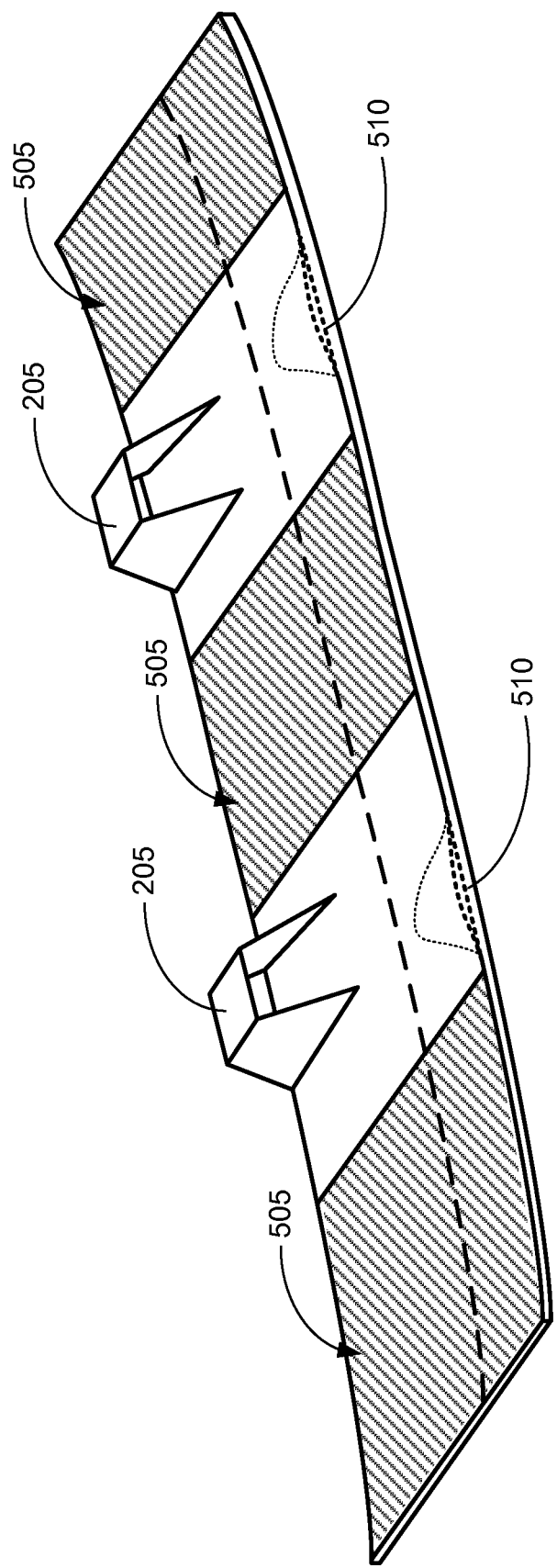
FIG. 5B is a detailed, perspective view of a composite barrel section including the reference areas, in accordance with some embodiments of the present disclosure.
Figure 6A:
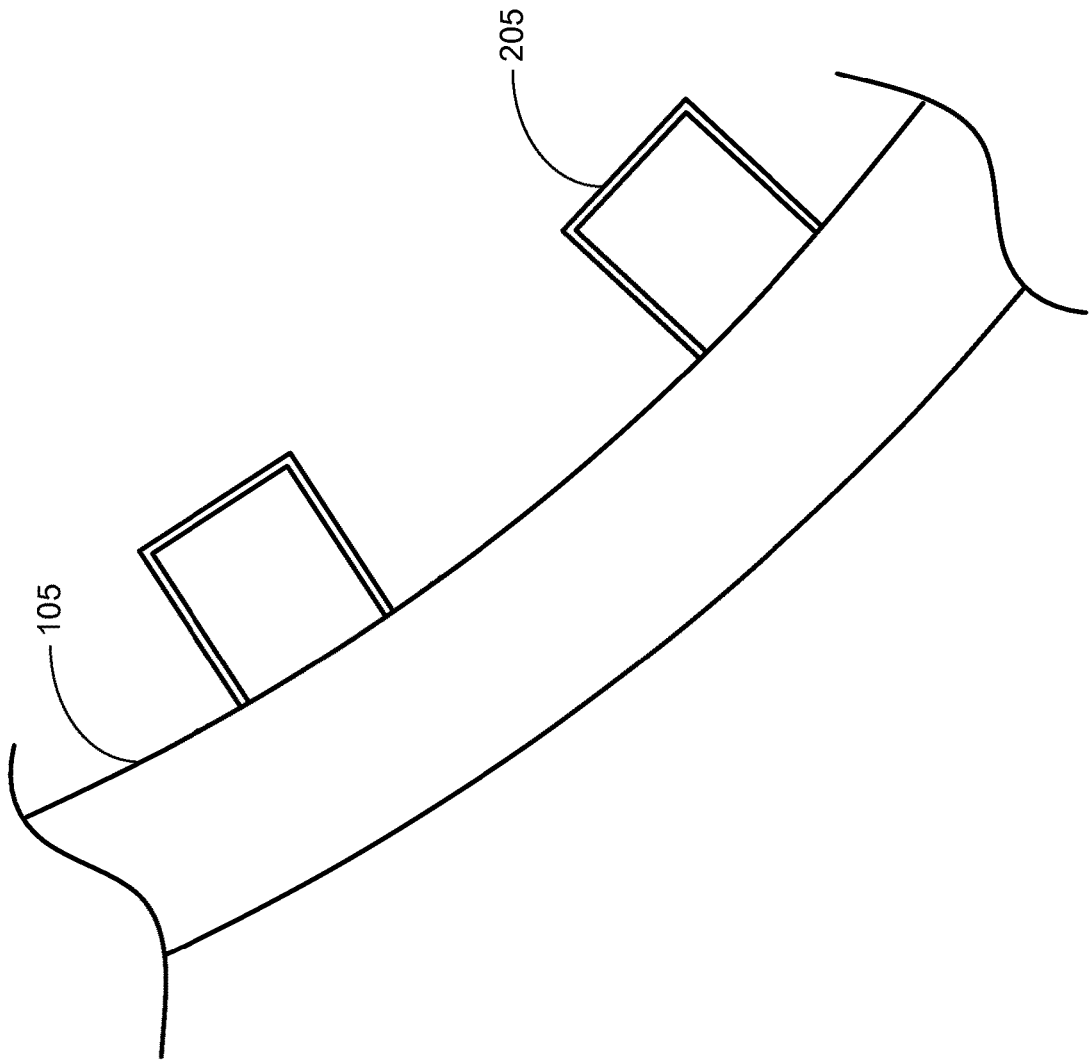
FIG. 6A is a detailed, end view of a composite barrel section after machining to a nominal curvature, in accordance with some embodiments of the present disclosure.
Figure 6B:
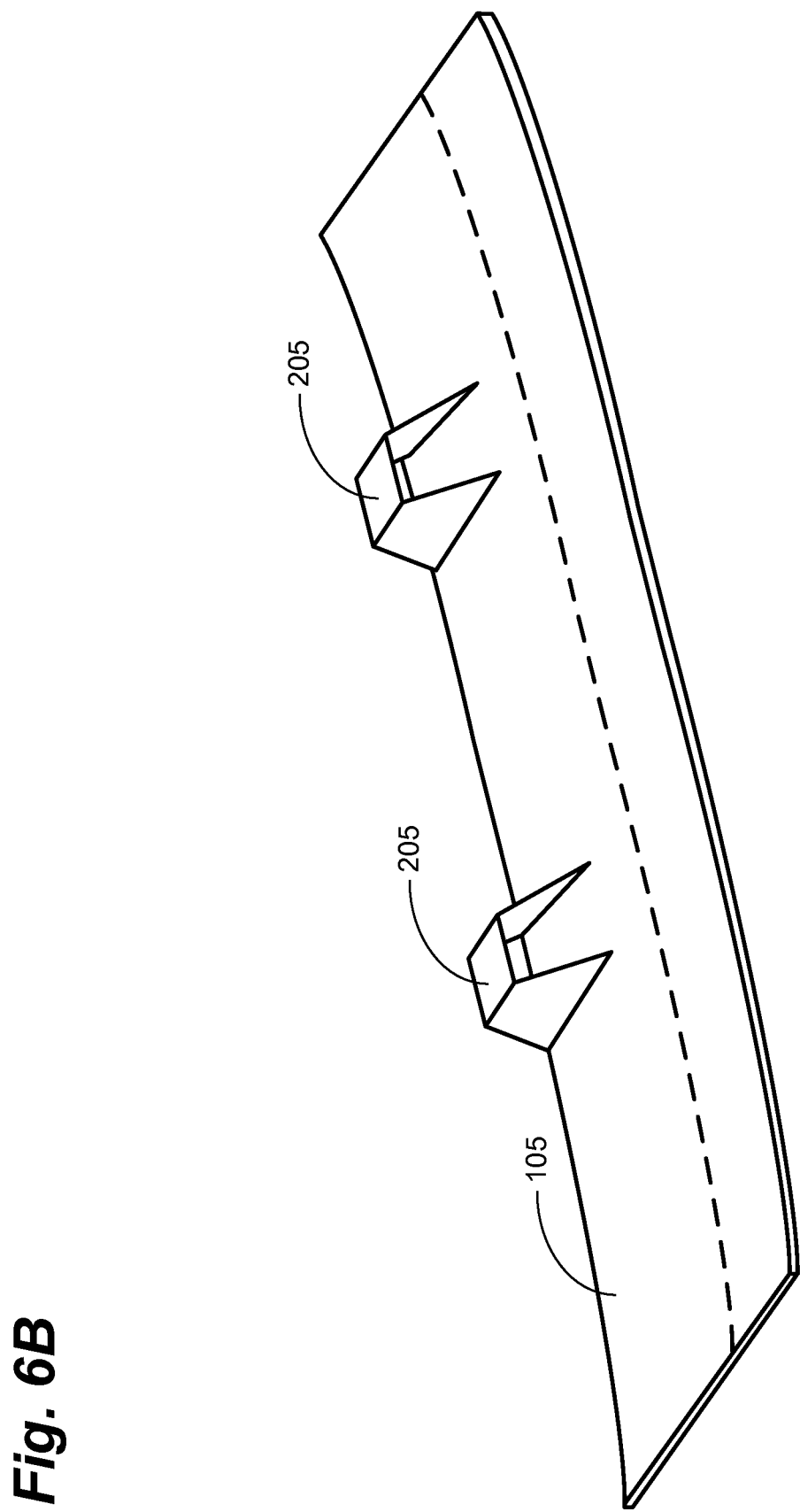
FIG. 6B is a detailed, perspective view of a composite barrel section after machining to the nominal curvature, in accordance with some embodiments of the present disclosure.

As shown in FIGS. 5A and 5B, the system can utilize the areas 505 between the stringers 205, for example, as "known good" areas to calculate the nominal curvature. In this manner, a local coordinate system can be established to locate the robot, obviating the need for an overall or aircraft coordinate system. Using curvature data from the imaging device, therefore, the system can plot the nominal curvature 510 and determine the amount of material that needs to be removed in this area. After machining, as shown in FIGS. 6A and 6B, the surface curvature can be substantially smooth and consistent around the inner diameter of the barrel section.

Figure 7:
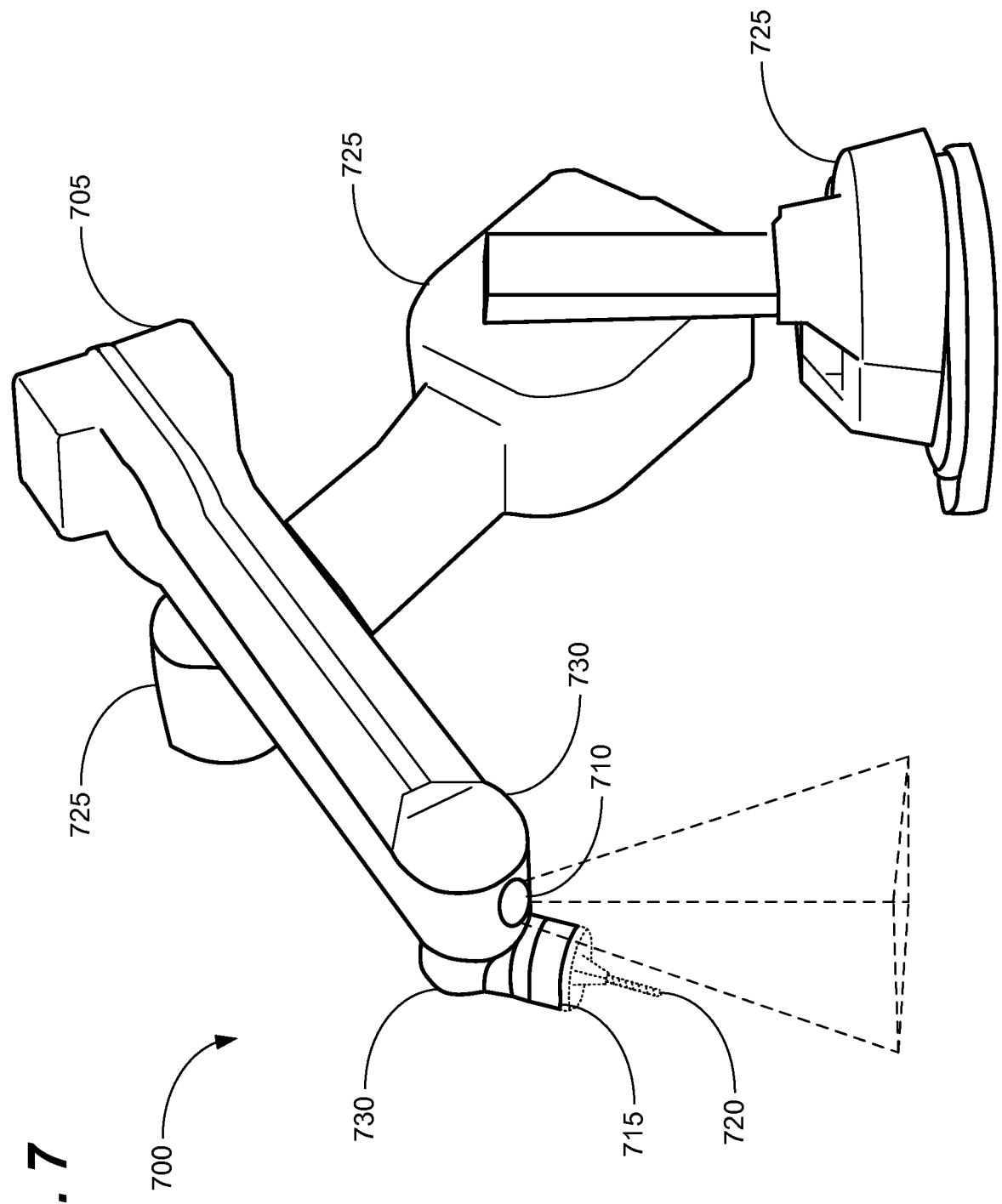
FIG. 7 depicts a robotic arm with imaging device, in accordance with some embodiments of the present disclosure.
Figure 8:
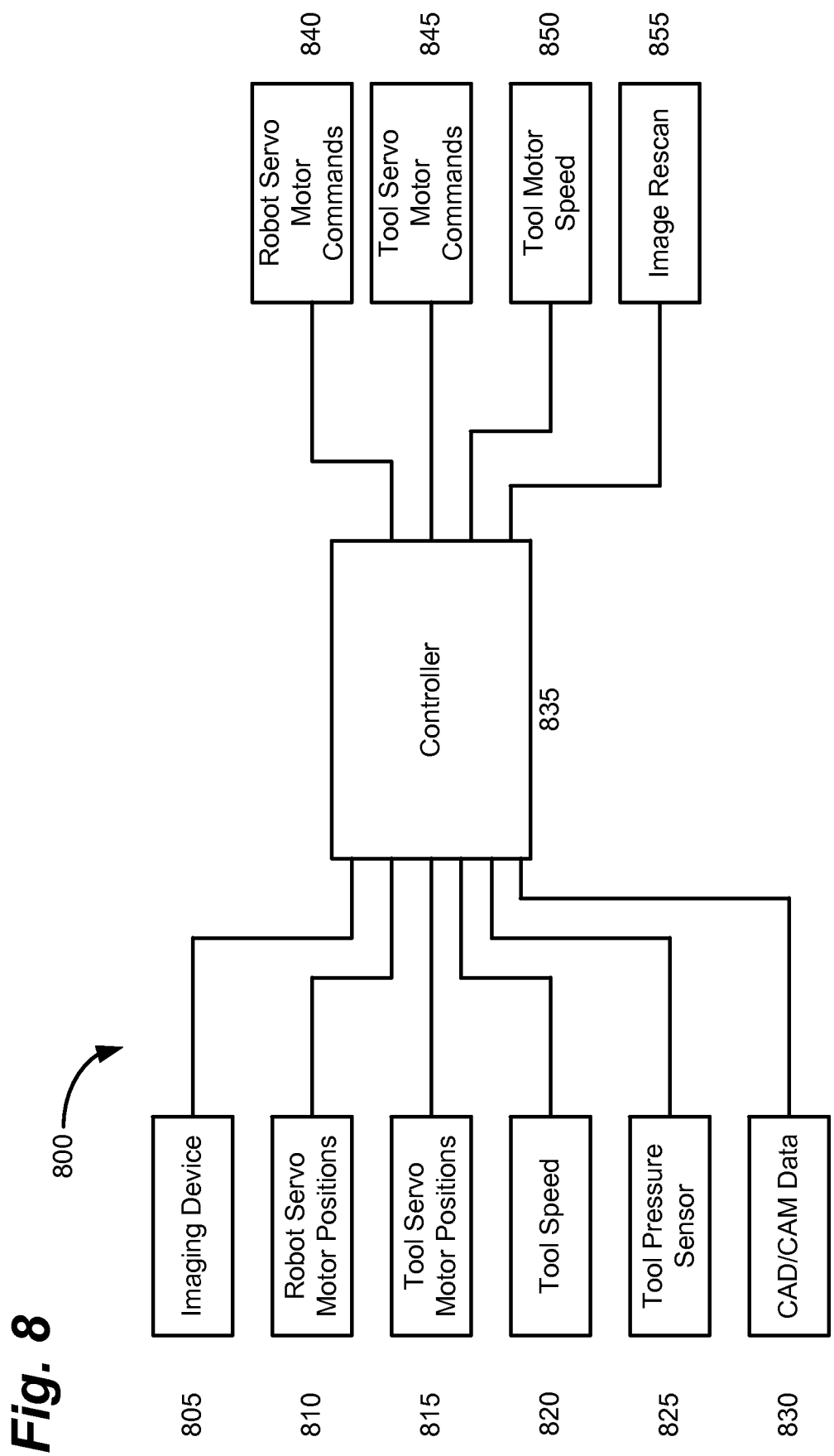
FIG. 8 depicts a control system for machining a composite barrel section to the nominal curvature, in accordance with some embodiments of the present disclosure.

In some embodiments, as shown in FIG. 7, the system 700 can comprise a robot 705 (e.g., a robot, robotic arm, CNC controlled mill, etc.) with one or more imaging devices 710. The robot 705 can comprise a robotic arm with one or more arm motors 725, for example, to precisely control the placement and movement of the arm, and one or more tool motors 730, to precisely control the placement and movement of one or more tools 720. In some embodiments, the robot 705 can comprise a robotic vehicle capable of clamping to and/or moving around the inner surface of the barrel 105.

The one or more imaging devices 710 can enable the robot 705 to scan a structure to determine if the structure conforms to a particular geometry, for example. In some embodiments, the imaging device 710 can comprise, for example and not limitation, high-definition video cameras, sonar, structured light 3D scanners, or ultrasound imagers. In a preferred embodiment, the imaging device 710 can comprise a suitable laser scanner such as, for example and not limitation, a Micro-Epsilon ScanControl 2D Laser Line Scanner.

The robot 705 can also comprise a tool holder 715 for holding one or more machining devices 720 to enable the robot 705 to reshape the surface of the structure as necessary to conform to a nominal geometry. In some embodiments, the tool holder 715 can comprise a vacuum tool holder similar to those used on CNC milling machines. In other embodiments, the tool holder 715 or can comprise an adjustable chuck, a magnetic tool holder, or quick-change system. In some embodiments, the machining device 720 can comprise, for example and not limitation, one or more end mills, sanding discs, sanding belts, side mills, or drills. In a preferred embodiment, the machining device 715 can comprise an end mill.

As mentioned above, the robot 705 can comprise multiple arm and tool servo motors 725, 730, respectively, to enable the robot 705 to traverse and rotate the machining device 720 to machine the inner diameter of the barrel. Of course, the robot 705 could be used in other areas of an aircraft, or on other vehicles using similar, localizing features. In some embodiments, the robot 705 can have on board processing. In other embodiments, the robot 705 can be networked with one or more controllers or computers that provide instructions.

Embodiments of the present disclosure can also comprise a system 800 for machining a surface to a nominal shape and/or curvature. In some embodiments, the system 800 can comprise a controller 835 for receiving various inputs and providing various outputs. The controller 835 can comprise, for example and not limitation, a microcontroller, a PC, an application specific integrated circuit (ASIC), or a field programmable gate array (FPGA).

One of the inputs to the controller 835 can comprise data from the imaging device 805. As mentioned above, the imaging device can comprise one or more imaging devices capable of scanning the surface of an object and determining its two- or three-dimensional surface features. The controller 835 can use this information to determine its position relative to internal or external feature of the object, to identify known good areas, and to calculate and project nominal curvature for machining operations, among other things.

In some embodiments, the controller 835 can also receive inputs from the robotic arms servo positioning motor(s) 810. This can provide the controller 835 with information about the position and movement of the robotic arm itself. Similarly, the controller can also receive inputs from the servo positioning motor(s) for the tool holder 815. In some embodiments, the controller 835 may also receive inputs from other sensors related to the tool holder such as, for example and not limitation, a tool speed sensor (e.g., RPM sensor) 820 and a tool pressure sensor 825. These sensors 820, 825 can be used to modulate tool speed and reduce wear and tear and breakage by detecting when the tool is being traversed too quickly or when the tool is cutting particularly hard material, for example. Of course, other sensors such as, for example, tool and motor temperature sensors could also be used and are contemplated herein.

In some embodiments, the system 800 can rely solely on inputs from the imaging device 805 to determine the nominal shape and curvature of an object. In other embodiments, the system 800 can rely on CAD/CAM data 830 from, for example, the original parts drawings to determine its position in space relative to the part and/or the nominal surface shape. In still other embodiments, the system 800 can use a combination of these inputs to calculate and verify shape, curvature, and tool paths.

The controller 835 can then either calculate or receive tool path information from a networked computer and provide commands (e.g., pulse width modulation, or PWM) to the robot's positioning motor(s) 840, tool holder positioning motor(s) 845, and tool drive motor 850 to machine the object to a nominal geometry. In some embodiments, during and/or after machining, the controller 835 can also scan and rescan 855 the surface to check progress, or determine if the surface machining is complete.

Of course, while disclosed above for use in preparing the joints for barrel sections 105, embodiments of the present disclosure are also applicable to other types of assemblies. Fiberglass boats, for example, are often assembled by manufacturing the hull and the deck separately. These parts are then joined together to form the complete boat. The joining surfaces of these components, however, should be as consistent as possible to provide structural integrity and, perhaps more importantly, a watertight seal. As a result, the system 800 can be used to machine the joining surfaces and remove manufacturing defects, as necessary.

Figure 9B:
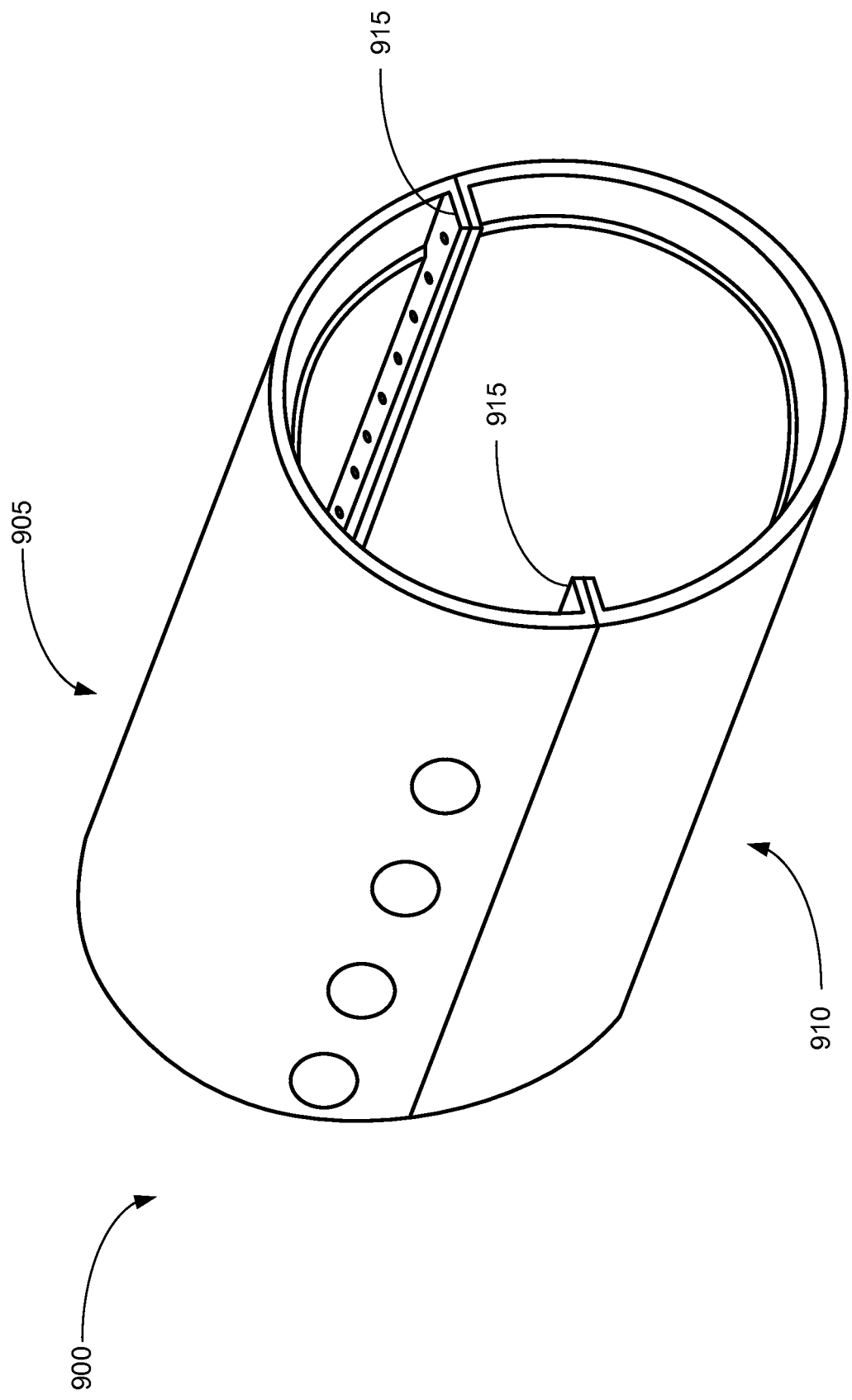
FIG. 9B depicts the two fuselage halves of FIG. 9A assembled, in accordance with some embodiments of the present disclosure.

As shown in FIGS. 9A and 9B, for example, the system 800 can also be used for clamshell type fuselage 900. In this configuration, the fuselage 900 is manufactured in two halves 905, 910 with a flange 915 at the join line. In this manner, the two halves 905, 910 can be manufactured separately and then assembled using adhesive and/or fasteners. As before, it is important that the mating surfaces 915A of the flanges 915 be substantially flat to provide proper bonding and, in the case of an aircraft or boat, proper sealing.

Figure 10A:
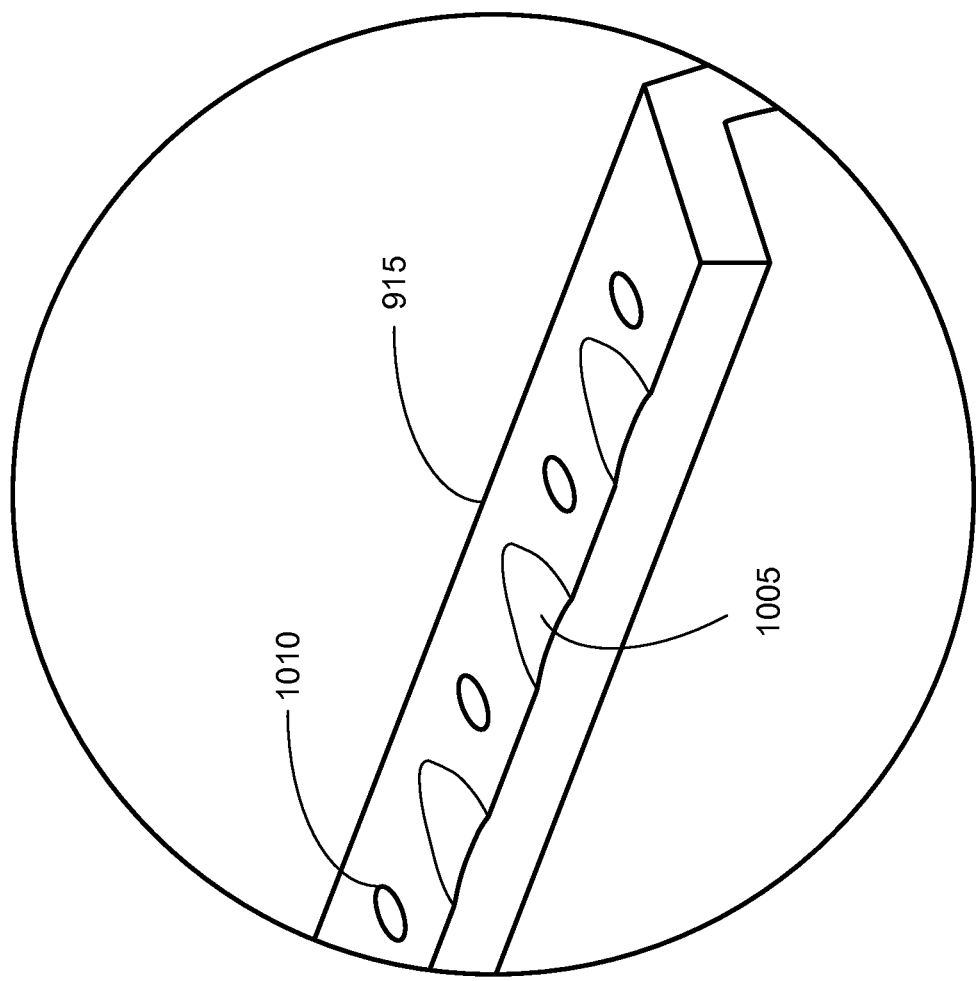
FIG. 10A is a detailed view of a mounting flange with surface defects, in accordance with some embodiments of the present disclosure.

As shown in FIG. 10A, however, the manufacturing process may leave surface irregularities 1005 along the flange 915. This can be due to uneven clamping pressure in the mold or deformation around bolts holes 1010, among other things. These surface irregularities 1005 can result in improper adhesion of the fuselage halves 905, 910 and improper sealing causing leaks and other issues.

Figure 10B:
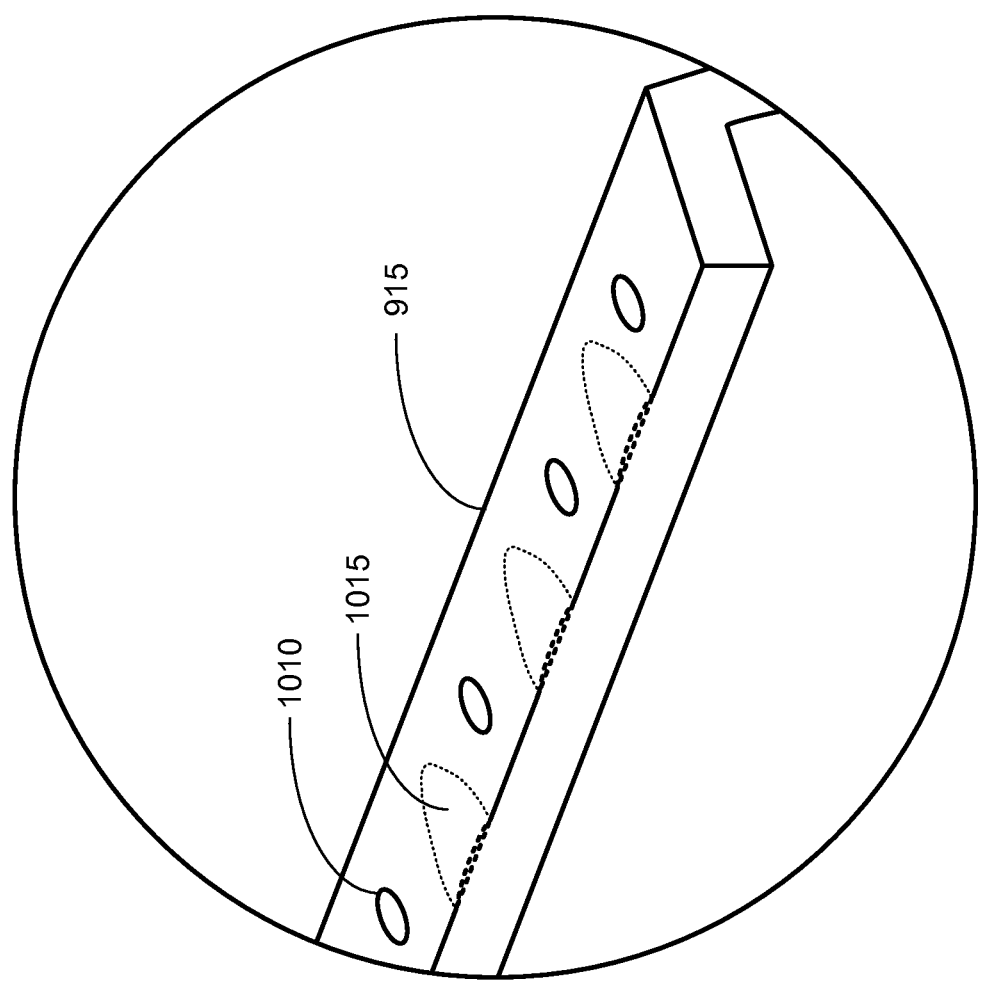
FIG. 10B is a detailed view of the mounting flange of FIG. 10A with the surface defects identified, in accordance with some embodiments of the present disclosure.
Figure 10C:
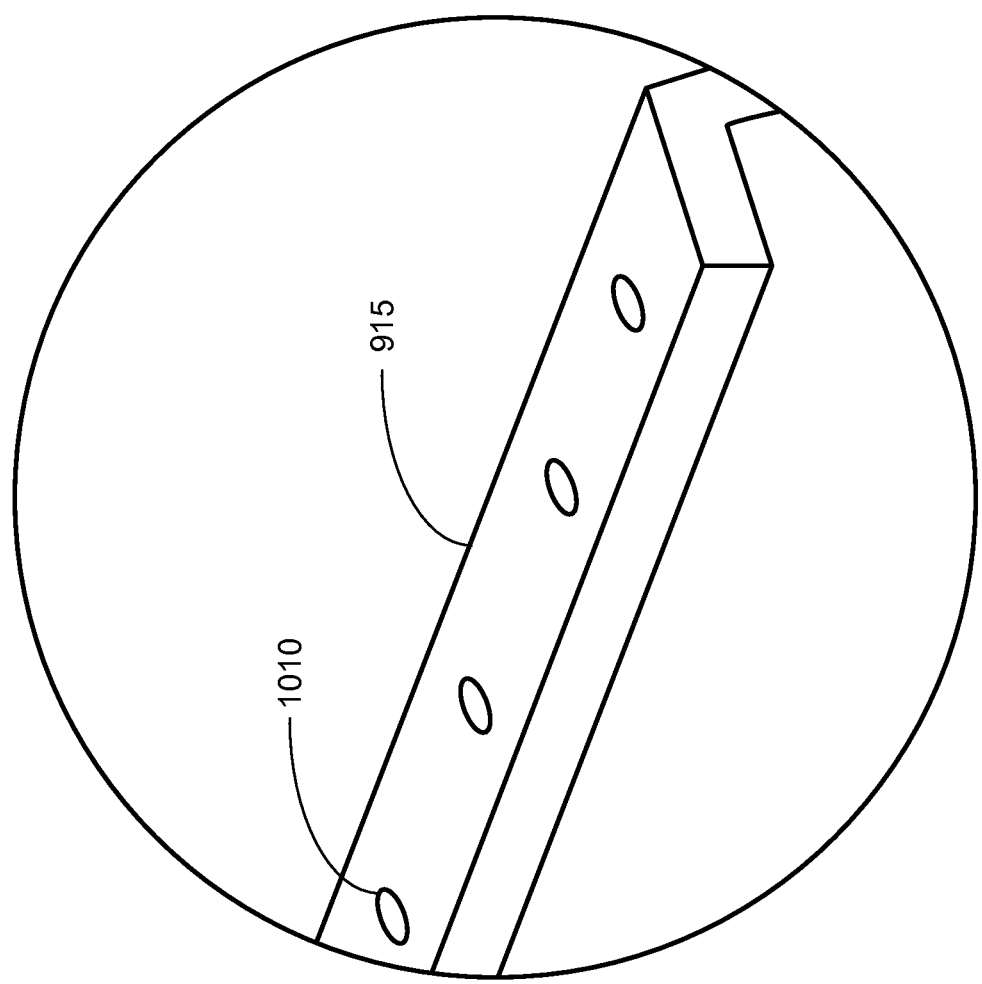
FIG. 10C is a detailed view of a mounting flange of FIG. 10A with the surface defects removed, in accordance with some embodiments of the present disclosure.

As shown in FIG. 10B, therefore, the system can utilize the bolt holes 1010, for example, to establish a local coordinate system to locate the robot, obviating the need for an overall, or aircraft, coordinate system. In this case, rather than using a nominal curvature, however, the system can calculate the nominal plane for the flange 915 and identify the surface irregularities 1005 that need to be removed. Using data from the imaging device, therefore, the system can overlay a linear (or planar) plot 1015 over the flange 915 and determine the amount of material that needs to be removed in this area. After machining, as shown in FIG. 10C, the flange 915 can be substantially smooth and consistent along the length of the barrel section.

While several possible embodiments are disclosed above, embodiments of the present disclosure are not so limited. For instance, while a computer controlled robotic arm has been disclosed, other suitable machines, such as a mobile robotic vehicle, for example, could be selected without departing from the spirit of the disclosure. In addition, the location and configuration used for various features of embodiments of the present disclosure such as, for example, the location of motors, sensors, and other components can be varied according to a particular aircraft or application that requires a slight variation due to, for example, the size or construction of the aircraft, the type of robot or tooling required, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method for machining an object to a nominal geometry comprising:
    scanning a surface of the object with a first imaging device;
    comparing data from the first imaging device to a predetermined dataset;
    determining a location of one or more structural features introduced onto the surface of the object based on the predetermined dataset;
    determining a location of one or more reference areas on the surface of the object that are free from defects greater than 0.005", wherein the location of the one or more reference areas is based on the location of the one or more structural features;
    determining a location of one or more surface defects that do not conform to the nominal geometry on the surface to be machined based on the location of the one or more reference areas;
    establishing a local coordinate system based on the location of the one or more reference areas;
    positioning a machining device based on the local coordinate system; and
    machining, with the machining device, the one or more surface defects to bring the surface to be machined to the nominal geometry.

2. The method of claim 1, wherein the predetermined dataset comprises one or more preexisting computer aided design computer aided manufacturing (CAD-CAM) files.

3. The method of claim 1, further comprising:
    calculating a nominal curvature based on a curve fit between two or more reference areas.

4. The method of claim 3, wherein calculating the nominal curvature is also based on one or more pre-existing CAD-CAM files for the surface.

5. The method of claim 3, further comprising:
    calculating one or more tool paths based on the calculated nominal curvature.

6. The method of claim 5, further comprising:
    rescanning the surface to determine whether the surface conforms to the nominal geometry.

7. The method of claim 1, further comprising:
    calculating a nominal planar surface based on the one or more reference areas.

8. The method of claim 7, wherein the surface of the object comprises a flange; and the one or more structural features comprise one or more bolt holes.

9. The method of claim 1, further comprising:
determining the location of the one or more of the reference areas on the surface based on data from the first imaging device.

10. The method of claim 1, further comprising:
determining the location of the one or more of the surface defects on the surface based on data from the first imaging device.

11. A method for returning an object to a nominal geometry comprising:
scanning a surface of the object with a first imaging device;
comparing data from the first imaging device to a predetermined dataset;
determining a location of one or more structural features introduced onto the surface of the object, wherein the location of the one or more structural features is based on the predetermined dataset;
determining a location of one or reference areas on the surface of the object that are free from defects greater than 0.005", wherein the location of the one or more reference areas is based on the location of the one or more structural features;
determining a location of one or more surface defects on the surface based on the location of the one or more reference areas;
determining a nominal geometry for the surface based on the one or more reference areas;
establishing a local coordinate system based on the location of the one or more reference areas;
positioning a machining device based on the local coordinate system;
calculating a tool path to machine the surface to the nominal geometry;
machining, with the machining device, the surface to the nominal geometry;
rescanning the surface with the first imaging device; and
determining if the surface conforms to the nominal geometry.

12. The method of claim 11, wherein determining the nominal geometry for the surface comprises calculating a curve fit between two or more of the reference areas.

13. The method of claim 12, wherein determining if the surface is at the nominal geometry comprises comparing the rescan of the surface to the curve fit.

14. The method of claim 12, wherein determining if the surface is at the nominal geometry comprises comparing the rescan of the surface to the predetermined dataset of the surface.

15. The method of claim 14, wherein the predetermined dataset comprises one or more preexisting computer aided design computer aided manufacturing (CAD-CAM) files.

16. A system for machining a surface of an object to a nominal geometry comprising:
a robotic arm comprising:
one or more arm motors configured to position the robotic arm;
one or more tool motors configured to position a tool holder on the robotic arm; and
one or more machining devices configured to machine the surface of the object to bring the surface to the nominal geometry; and
a first imaging device configured to identify:
one or more structural features introduced onto the surface of the object, wherein a location of the one or more structural features is based on a predetermined dataset;
one or more reference areas on the surface of the object that are free from defects greater than 0.005", wherein the location of the one or more reference areas is based on the location of the one or more structural features; and
one or more surface defects on the surface to be machined based on a location of the one or more reference areas; and
a controller configured to:
determine a position of the system relative to the surface based on the reference areas; and
position the one or more machining devices relative to the surface based on the position of the system relative to the surface, thereby to machine the one or more surface defects on the surface of the object to bring the surface to the nominal geometry.

17. The system of claim 16, wherein the first imaging device comprises a laser scanner, a video camera, or both.

18. The system of claim 16, wherein the further comprising: a controller calculates a nominal surface geometry based on the one or more reference areas and to create a tool path for the one or more arm motors and the one or more tool motors to machine the surface to the nominal geometry.

19. The system of claim 16, wherein the controller is further configured to:
compare one or more structural features, one or more reference areas, or both to a predetermined dataset to locate one or more surface defects; and
calculate a nominal surface geometry based on the one or more structural features, one or more reference areas, or both, and
create a tool path for the one or more arm motors and the one or more tool motors to machine the surface to the nominal geometry.

20. The system of claim 16, further comprising a tool RPM sensor to determine a tool speed of the tool path.

* * * * *